(12) United States Patent
Justusson et al.

(10) Patent No.: US 12,553,862 B2
(45) Date of Patent: Feb. 17, 2026

(54) METHOD AND APPARATUS FOR ANALYZING A COMPOSITE STRUCTURE

(71) Applicant: The Boeing Company, Arlington, VA (US)

(72) Inventors: Brian Patrick Justusson, Saint Peters, MO (US); Joseph Daniel Schaefer, Richmond Heights, MO (US)

(73) Assignee: The Boeing Company, Arlington, VA (US)

( * ) Notice: Subject to any disclaimer, the term of this patent is extended or adjusted under 35 U.S.C. 154(b) by 298 days.

(21) Appl. No.: 18/348,505

(22) Filed: Jul. 7, 2023

(65) Prior Publication Data

US 2025/0012761 A1   Jan. 9, 2025

(51) Int. Cl.
*G01N 29/04* (2006.01)
*G01N 29/44* (2006.01)

(52) U.S. Cl.
CPC ....... *G01N 29/045* (2013.01); *G01N 29/4481* (2013.01); *G01N 2291/0231* (2013.01); *G01N 2291/0289* (2013.01)

(58) Field of Classification Search
CPC ............ G01N 29/045; G01N 29/4481; G01N 2291/0231; G01N 2291/0289; G06F 30/23; G06F 2113/24; G06F 30/20; G06F 30/15; G06F 2113/26; G06F 30/27; G16C 20/70; G16C 60/00
See application file for complete search history.

(56) References Cited

U.S. PATENT DOCUMENTS

2016/0061779 A1*  3/2016  Barry .................... G01N 29/24
                                                       73/632
2019/0339234 A1* 11/2019  Finn ..................... G01N 29/043

FOREIGN PATENT DOCUMENTS

CN          115099028 A       9/2022

OTHER PUBLICATIONS

European Patent Office, Extended European Search Report Issued in Application No. 24183216.1, Dec. 6, 2024, Germany, 10 pages.
(Continued)

*Primary Examiner* — Tarun Sinha
(74) *Attorney, Agent, or Firm* — Alleman Hall LLP

(57) ABSTRACT

A method of analyzing a composite structure for damage tolerance. The method includes obtaining a structural configuration and determining at least one metric of interest for the structural configuration. A dent depth meta-model is developed based on the structural configuration, the at least one metric of interest, and information obtained from a machine learning algorithm. The at least one metric of interest provides a constraint for the dent depth meta-model and the machine learning algorithm is trained based on a historical physical test dataset of a plurality of composite components. The dent depth meta-model is utilized to estimate an impact energy to establish a threshold dent depth in the structural configuration. A computer-based simulation is performed with the structural configuration utilizing the impact energy from the dent depth meta-model. At least one design value is determined for the structural configuration based on output data generated from the computer-based simulation.

20 Claims, 2 Drawing Sheets

(56) References Cited

OTHER PUBLICATIONS

Hasebe, S et al., "Internal low-velocity impact damage prediction in CFRP laminates using surface profiles and machine learning," Composites Part B, vol. 237, Mar. 28, 2022, 11 pages.

Li, J et al., "Comparison of artificial neural networks with response surface models in characterizing the impact damage resistance of sandwich airframe structures," Second International Symposium on Computational Intelligence and Design, Dec. 12, 2009, 6 pages.

Jiang, F et al., "Study on Prediction of Compression Performance of Composite Laminates After Impact Based Convolutional Neural Networks," Applied Composite Materials, vol. 28, No. 4, May 12, 2021, 21 pages.

\* cited by examiner

METHOD AND APPARATUS FOR ANALYZING A COMPOSITE STRUCTURE

FIELD

The present disclosure relates to the field of structural analysis and in particular structures made of composite materials for damage tolerant design.

BACKGROUND

Certification of aircraft requires the demonstration of durability and damage tolerance (DaDT). DaDT refers to the ability of the structure to resist damage growth under cyclic conditions and retain sufficient strength through the lifetime of the aircraft in the presence of damage/defects. Damage tolerance typically refers to the ability of the structure to retain sufficient strength in the presence of a defect/damage state that may or may not be easily detectable.

Current approaches for demonstrating damage tolerant structural design rely on a largely subjective structural testing process which utilizes test articles exhibiting damage that must be identified by visual inspection from a pre-defined distance. Due to inherent uncertainty of the visual inspection, a threshold dent depth might be adopted to quantify an acceptable initial damage state to demonstrate damage tolerance. While metallic based structures can be analyzed with a traditional finite-element analysis, the complexity of composite structures limits a digital model's ability to predict dent depth and underlying damage extent within a composite structure.

SUMMARY

A method of analyzing a composite structure for damage tolerance is disclosed herein. The method includes obtaining a structural configuration for a composite component and determining at least one metric of interest for the structural configuration. A dent depth meta-model is developed based on the structural configuration of the composite component, the at least one metric of interest, and information obtained from a machine learning algorithm. The at least one metric of interest provides a constraint for the dent depth meta-model and the machine learning algorithm is trained based on a historical physical test dataset of a plurality of composite components. The dent depth meta-model for the structural configuration is utilized to estimate an impact energy to establish a threshold dent depth in the structural configuration. A computer-based simulation is performed with the structural configuration utilizing the impact energy from the dent depth meta-model. At least one design value is determined for the structural configuration based on output data generated from the computer-based simulation.

In one or more embodiments of the method, developing the dent depth meta-model includes providing a greater weight to the historical physical test dataset of a plurality of previously analyzed physical composite components based on a similarity of material or configuration between the structural configuration and a corresponding one of the previously analyzed physical composite components.

In one or more embodiments of the method, the plurality of previously analyzed physical composite components includes composite components from multiple different vehicle platforms.

In one or more embodiments of the method, the historical physical test dataset includes a plurality of test data inputs associated with corresponding test data outputs for a plurality of previously analyzed physical composite components.

In one or more embodiments of the method, the test data inputs include at least one of a force-time history, displacement-time history, an impact energy-time history, an impactor configuration, a dent depth, material properties, relevant boundary conditions, or a composite structural configuration defining composite layup and geometry.

In one or more embodiments of the method, the material properties include at least one of mode 1 strain energy rates, mode 2 strain energy rates, interlaminar strengths, stiffness ply properties, or ply strength properties.

In one or more embodiments of the method, the test data outputs include at least one of damage types resulting from an impact, energy absorbed from the impact, or a measured dent depth.

In one or more embodiments of the method, the structural configuration includes at least one of a skin joined to a stiffening member, the skin joined to a secondary structure, or a stiffened structure joined to the secondary structured with the secondary structural including at least one of a rib or a spar.

In one or more embodiments of the method, the at least one metric of interest includes a dynamic stiffness, an energy absorption rate, an energy flux into the structural configuration, or an initial deflection rate.

In one or more embodiments of the method, output data generated from the computer-based simulation includes a determination of strength of a damaged portion of the structural configuration under at least one of compression loading, tension loading, and shear loading.

In one or more embodiments of the method, the composite component includes a plurality of individual composite elements fixed relative to each other.

In one or more embodiments of the method, the historical physical test dataset includes calculations for damage tolerance criteria based on a physical test data.

In one or more embodiments of the method, the machine learning algorithm includes a Bayesian based algorithm or a physics informed algorithm.

A non-transitory computer-readable medium embodying programmed instructions which, when executed by a processor, are operable for performing a method is disclosed herein. The method includes obtaining a structural configuration for a composite component and determining at least one metric of interest for the structural configuration. A dent depth meta-model is developed based on the structural configuration of the composite component, the at least one metric of interest, and information obtained from a machine learning algorithm. The at least one metric of interest provides a constraint for the dent depth meta-model and the machine learning algorithm is trained based on a historical physical test dataset of a plurality of composite components. The dent depth meta-model for the structural configuration is utilized to estimate an impact energy to establish a threshold dent depth in the structural configuration. A computer-based simulation is performed with the structural configuration utilizing the impact energy from the dent depth meta-model. At least one design value is determined for the structural configuration based on output data generated from the computer-based simulation.

In one or more embodiments, the historical physical test set includes a plurality of test data inputs associated with corresponding test data outputs for a plurality of previously analyzed physical composite components and the historical physical test dataset includes calculations for damage tolerance criteria based on a physical test data.

In one or more embodiments, the test data inputs include at least one of a force-time history, displacement-time history, an impact energy-time history, an impactor configuration, a dent depth, material properties, relevant boundary conditions, or a composite structural configuration defining composite layup and geometry.

In one or more embodiments, the material properties include at least one of mode 1 strain energy rates, mode 2 strain energy rates, interlaminar strengths, stiffness ply properties, or ply strength properties.

In one or more embodiments, the test data outputs include at least one of damage types resulting from an impact, energy absorbed from the impact, or a measured dent depth.

In one or more embodiments, the at least one metric of interest includes a dynamic stiffness, an energy absorption rate, an energy flux into the structural configuration, or an initial deflection rate.

A non-transitory computer-readable medium embodying programmed instructions which, when executed by a processor, are operable for performing a method is disclosed herein. The method includes obtaining a structural configuration for a composite component and determining at least one metric of interest for the structural configuration. A dent depth meta-model is developed based on the structural configuration of the composite component, the at least one metric of interest, and information obtained from a machine learning algorithm. The at least one metric of interest provides a constraint for the dent depth meta-model, the machine learning algorithm is trained based on a historical physical test dataset of a plurality of composite components, and the historical physical test dataset includes calculations for damage tolerance criteria based on a physical test data. The dent depth meta-model for the structural configuration is utilized to estimate an impact energy to establish a threshold dent depth in the structural configuration. A computer-based simulation is performed with the structural configuration utilizing the impact energy from the dent depth meta-model. At least one design value is determined for the structural configuration based on output data generated from the computer-based simulation.

DESCRIPTION OF THE DRAWINGS

Some embodiments of the present disclosure are now described, by way of example only, and with reference to the accompanying drawings. The same reference number represents the same element or the same type of element on all drawings.

DESCRIPTION

The Figures and the following description illustrate specific exemplary embodiments of the disclosure. A person of ordinary skill in the art will be able to devise various arrangements that, although not explicitly described or shown herein, embody the principles of the disclosure and are included within the scope of the disclosure. Furthermore, any examples described herein are intended to aid in understanding the principles of the disclosure and are to be construed as being without limitation to such specifically recited examples and conditions. As a result, the disclosure is not limited to the specific embodiments or examples described below but by the claims and their equivalents.

Figure 1:
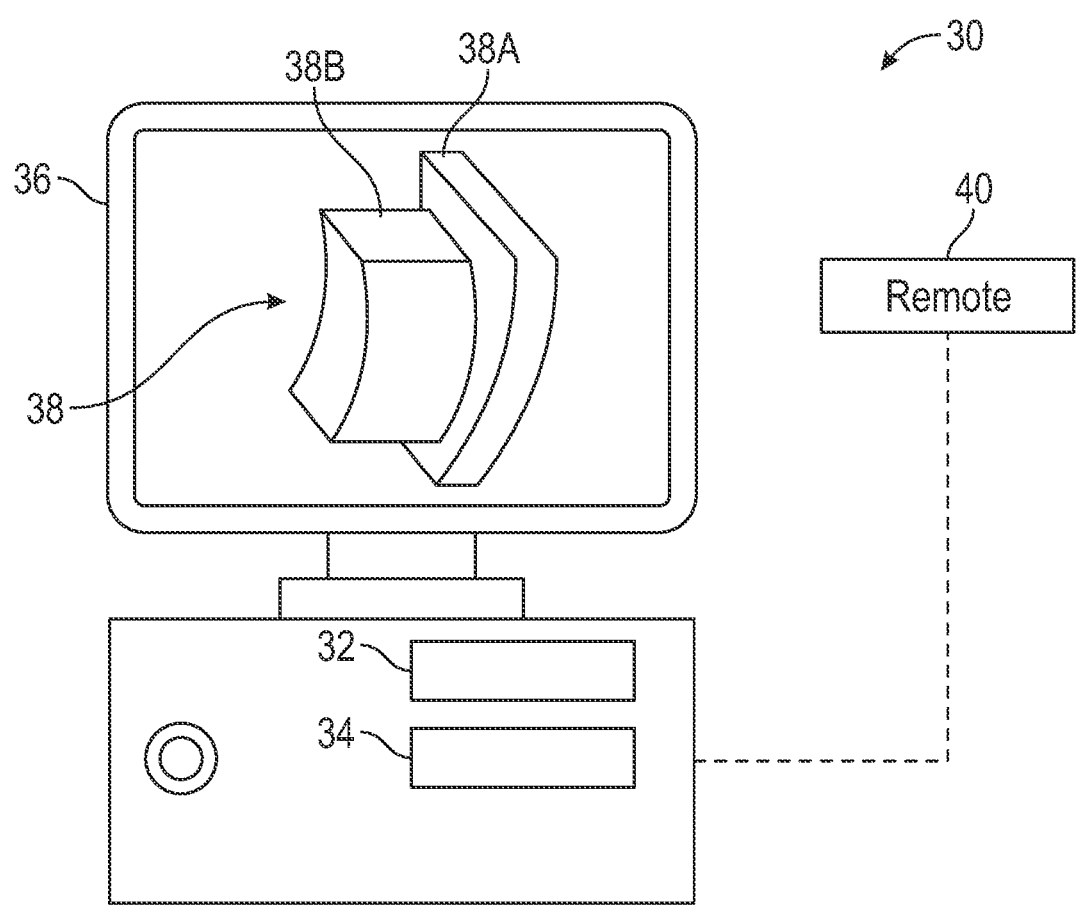
FIG. 1 illustrates an example computer system.

FIG. 1 illustrates an example computer system 30 as a unitary computer module for illustrative simplicity, the computer system 30 can be physically embodied as one or more processing nodes having a non-transitory computer-readable storage medium 34, i.e., application-sufficient memory, and associated hardware and software, such as but not limited to a high-speed clock, timer, input/output circuitry, buffer circuitry, and the like. The non-transitory computer-readable storage medium 34 may include enough read only memory, for instance magnetic or optical memory. Computer-readable code or instructions embodying the methods described below may be executed during operation of the computer system 30. To that end, the computer system 30 may encompass one or more processors 32, e.g., logic circuits, application-specific integrated circuits (ASICs), central processing units, microprocessors, and/or other requisite hardware as needed to provide the programmed functionality described herein.

A display screen 36 may be connected to or in communication with the computer readable medium 34 and processor(s) 32 to facilitate a graphical interface for a user implementing this disclosure as set forth below to display a structural configuration 38 of a composite component. In one example, the structural configuration 38 for the composite component includes a three-dimensional computer aided design (CAD) representing the composite component in a digital domain. In the illustrated example, the structural configuration 38 includes a first composite element 38A, such as a composite skin, configured structure (e.g. stiffeners, ribs, spars, frames), or joint (e.g. bonded, co-bonded, fastened). The first composite element 38A can also be attached to a composite element such as a composite rib or spar. The structural configuration 38 can also include acreage, joints, parts, sub-components, components, and assemblies.

Due to the complexity of composite structures, accurately predicting dent depth in structural configurations for composite components in a digital domain has been challenging. This is because the dent depth is influenced by many interrelated considerations. One consideration influencing dent depth in composite components includes boundary conditions.

Another consideration influencing dent depth in composite components includes configuration effects, e.g., energy absorption or load paths. With configuration effects, larger structures tend to have more compliant responses due to the aforementioned joints, configured attachments, etc. resulting in larger energies required to achieve the dent depth. For this reason, threshold impact energies observed at the flat coupon level typically used for sizing are much lower than those observed in a configured panel at the element level. This can lead to the configured panel having a greater dent resistance than the coupon level element used for testing. Because the panel exhibits greater dent resistance than predicted from the coupon level element testing, the panel can be stronger than needed which can lead to having heavier components.

A further consideration influencing dent depth in composite components includes layup or thickness of material in the composite component. This increases the complexity of analyzing composite components because dent depth is not constant across layups or even for thicknesses. Also, some applications for composite structure include a metallic component within the stack-up. Thus, some parts of the structural configuration may involve composite-aluminum-composite, composite-Ti-composite, and other permutations of composite with metallics within the total stack.

Yet another consideration influencing dent depth in composite components includes the material properties of the composite material. Modern toughened composites rely on toughening agents mixed in the matrix. One common toughening agent includes thermoplastics. These materials experience both elastic non-linearity and damage when undergoing impact making it difficult to separate out responses that contribute to predicting dent depth in composite components that include them.

Still another consideration influencing dent dept in composite structures includes the interlayers/interfaces between plies with the composite layup. This interface can be ply to ply, composite layup to composite layup, or other composites to a rib, spar, frame, or stringer using a nano-enhancement, adhesive, etc.

Considerable work has been (and may yet be) done across industry to improve damage tolerant design via modification of the ply to ply, or comp layup to comp layup, or other comp to rib/spar/frame/stringer interfaces using some form of nano-enhancement/adhesive/etc. This could impact inner mold line (IML) or outer mold line (OML) simulations and even impact laminate acreage.

Due to the above considerations regarding the complexity of composite structures, an example testing practice is to develop physical screening coupons to determine the threshold impact energy that will generate a threshold dent depth. This approach involves testing multiple different impact energies to converge to the threshold impact energy for each impact location. This approach is used for determining the threshold impact energy to then apply to the coupon, element, or sub-component in which damage tolerance is being demonstrated. While tools exist for demonstrating damage tolerance, industry is limited by the requirements to perform impact survey testing for each configuration as changes occur. This approach results in significant costs to build and test the composite components for damage tolerance.

One feature of this disclosure is to provide an analytical approach to determine composite structure damage tolerance without building and testing physical hardware. The analytical approach utilizes a dent-depth meta-model that is informed by historical physical test dataset through a machine learning (ML) algorithm to estimate impact energy for simulating dent depth in the structural configuration 38 of the composite component. The disclosed approach can reduce development costs associated with testing physical survey panels and enable expansion of the design space by evaluating structural configurations of composite components in a digital domain on a much faster timeframe. For example, the approach disclosed herein can reduce testing time from months to days or even hours.

Figure 2:
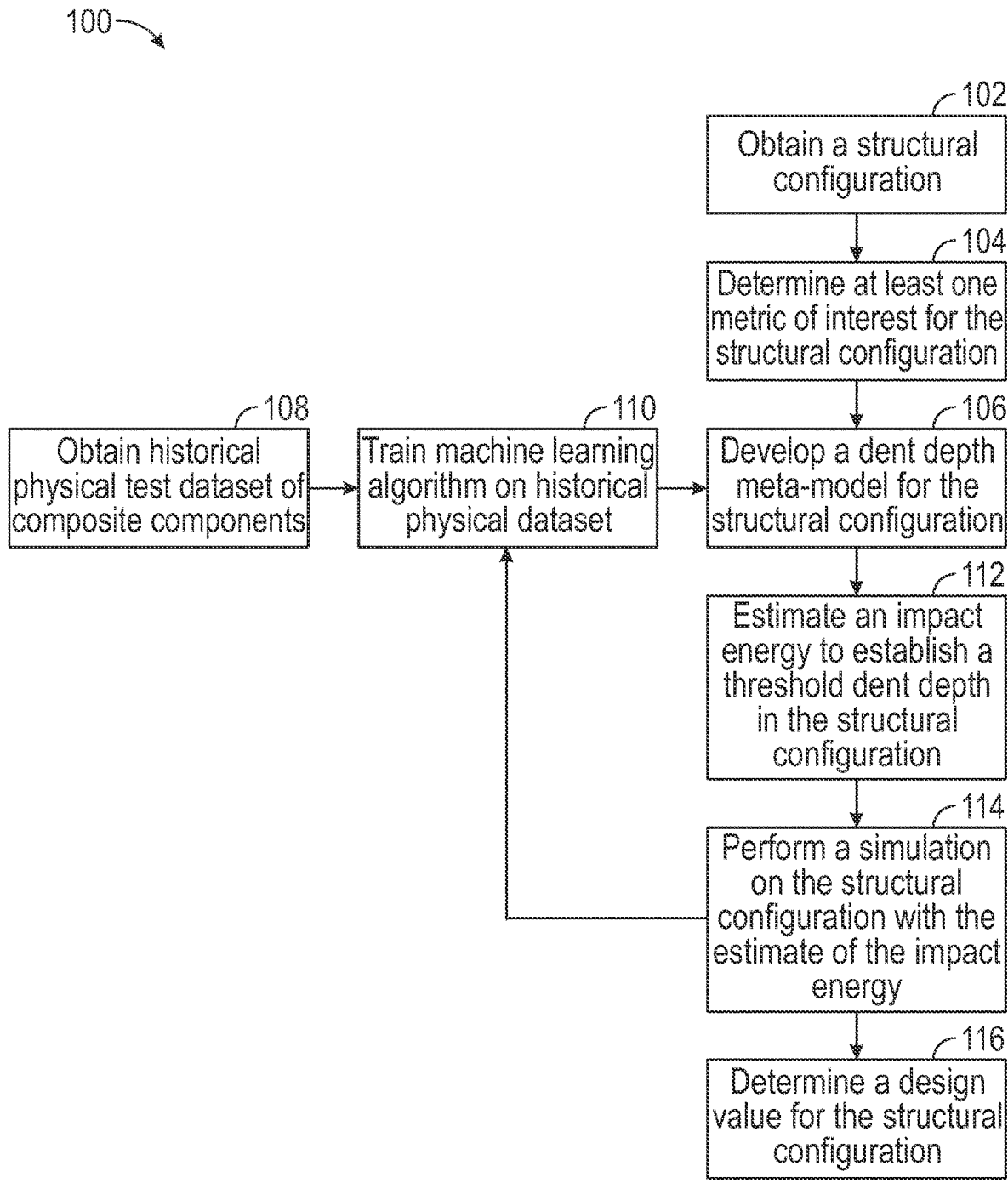
FIG. 2 illustrates a method of analyzing a composite structure for damage tolerance.

FIG. 2 illustrates an example method 100 of analyzing the structural configuration 38 of the composite component for damage tolerance. The method 100 includes receiving a structural configuration 38 of the composite component (Block 102). In one example, the structural configuration 38 defines a composite component having a single-stiffener level and is represented in a three-dimensional digital domain.

The structural configuration 38 can identify at least one composite material forming the structural configuration 38 and at least one composite element joined relative to another composite element. For example, the structural configuration 38 can include composite elements, such as at least one of a skin joined to a stiffening member, a skin joined to a secondary structure, or a stiffened structure joined to the secondary structured with the secondary structural including at least one of a rib or a spar. The composite elements represented in the structural configuration 38 can be bonded, joined, affixed, or attached relative to each other in the structural configuration 38.

The method 100 then determines at least one metric of interest for the structural configuration 38 at Block 104. The at least one metric of interest can include a dynamic stiffness, an energy absorption rate, an energy flux into the composite component, or an initial deflection rate. In one example, the at least one metric of interest can be selected by a user of the computer system 30 for evaluation. Alternatively, the computer system 30 can preselect at least one metric of interest for evaluation.

The method 100 can then develop a dent depth meta-model (Block 106) based on the structural configuration (Block 102), the at least one metric of interest (Block 104), and information obtained from a machine learning algorithm (Block 110). The at least one metric of interest (Block 104) provides a constraint for development of the dent depth meta-model at Block 106.

For the machine learning algorithm at Block 110 to provide information for the development of the dent depth meta-model at Block 106, the machine learning algorithm is trained. The machine learning algorithm can be previously trained based on a historical physical test dataset from Block 108 as an input training dataset. In addition to physical test data, the historical physical test dataset from Block 108 includes calculations for damage tolerance criteria based on the physical test data. The calculations can be performed at Block 108 by the computer system 30 or the calculations can be performed prior to the method 100 obtaining the historical physical test dataset at Block 108. The damage tolerance criteria can be based on at least one of calculations (theory), such as hand calculations, design curves (theoretical, semi-empirical, empirical), or the associated design criteria/guidelines driving the structural configurations (e.g., safety margins).

Alternatively, the machine learning algorithm can be trained on the historical physical test dataset from Block 108 in connection with the development of the dent depth meta-model for the specific structural configuration from Block 102. In one example, the machine learning algorithm from Block 110 is a Bayesian based algorithm. However, other types of machine learning algorithms can be used, such as physics informed machine learning algorithms.

The historical physical test dataset (Block 108) of composite components includes many different configurations of composite components with varying material properties. In one example, the historical physical test dataset obtained at Block 108 is generated from development of multiple product assemblies, such as aircraft platforms, land vehicle platforms, or other largely composite platforms, and not specifically generated for evaluation of the structural configuration 38. The historical physical test dataset can also include data collected over a period of years with composite components of varying complexity and material structure.

The historical physical test dataset (Block 108) can include a set of physical test input data associated with a corresponding set of physical test data output data for each of the physical tests performed for the different configurations of composite components. The set of physical test input data can include at least one of a force-time history, a displacement-time history, an impact energy-time history, an impactor configuration, a dent depth, material properties, relevant boundary conditions, relevant environmental conditions (e.g., thermal and moisture), or composite structural configurations including layup and geometry of the composite. The material properties from the physical test input data can include at least one of mode 1 strain energy release rates, mode 2 strain energy release rates, interlaminar strengths, stiffness ply properties, or ply strength properties.

The set of physical test output data can include at least one of damage types resulting from an impact during the physical test recorded as input data, energy absorbed from the impact during the physical test, or a dent depth in the composite component resulting from the physical test.

In one example, the historical physical test dataset from Block 108 can be divided into three main categories of composite component assemblies with each category including the physical test input data and the physical test output data identified above. The first or broadest category of composite components from the historical physical test dataset (Block 108) includes physical test data regarding material property evaluations. This type of physical test data can include information regarding material screening and selection, material specification development, or allowable development. The second or intermediate type of physical test data includes physical test data regarding design-value development. This type of physical test data can include information regarding sub-component tests and structural element tests. The third or highest type of physical test data regarding complexity of the composite component includes physical test data with analysis validation. This type of physical test data can include information regarding full-scale tests and component tests.

During development of the dent depth meta-model at Block 106, a greater weight may be provided to the historical physical test dataset of the plurality of composite components having a greater similarity of at least one of material or configuration between the structural configuration 38 of composite component and a corresponding one of the plurality of composite components from the historical physical tests. The machine learning algorithm can be previously trained based on the historical physical test dataset, or it can be trained in connection with the development of the dent depth meta-model. Also, the machine learning algorithm can be trained on the computer system 30 or on a remote computer system 40 having a greater amount of computing power than the computer system 30. Also, the historical physical test dataset can be stored on the remove computer system 40 or stored in the computer-readable medium 34 on the computer system 30.

The method 100 then utilizes the dent depth meta-model developed for the structural configuration 38 from Block 106 to estimate the impact energy required to establish the threshold dent depth in the structural configuration (Block 112). In one example, the threshold dent depth corresponds to a dent depth of 0.01 inches in a surface of the structural configuration 38. In another example, the threshold dent depth corresponds to a dent depth of 0.02 inches in the structural configuration 38.

With the impact energy needed to establish the threshold dent depth in the structural configuration of the composite component, the method 100 can perform a computer-based simulation (Block 114) with the structural configuration 38 utilizing the estimated impact energy from Block 112. The computer-based simulation generates output data that includes a determination of strength of a damaged portion of the structural configuration under at least one of compression loading, tension loading, or shear loading. The computer-based simulation could include a low velocity impact (LVI) simulation, a high velocity impact (HVI) simulation, outer mold line (OML), inner mold line (IML), or another type of impact simulation on the structural configuration.

Also, the computer-based simulation includes a set of input data and a set of output data similar to the information obtained at Block 108 from the historical physical test dataset. Results from Block 114 may be recursively provided back to Block 110 to improve the machine learning model as accuracy of the simulations increase to provide a larger training dataset for the machine learning algorithm.

The method 100 can then use the information from the simulation to determine a design value for the structural configuration 38. The determination of the design value at Block 116 allows for significant savings through digital engineering as opposed to performing physical tests on varying degrees of complexity composition components.

The following Clauses provide example configurations of systems and methods for an example method 100 of analyzing a composite structure for damage tolerance of FIG. 2

Clause 1: A method of analyzing a composite structure for damage tolerance, the method comprising: obtaining a structural configuration for a composite component; determining at least one metric of interest for the structural configuration; developing a dent depth meta-model based on the structural configuration of the composite component, the at least one metric of interest, and information obtained from a machine learning algorithm, wherein the at least one metric of interest provides a constraint for the dent depth meta-model and the machine learning algorithm is trained based on a historical physical test dataset of a plurality of composite components; utilizing the dent depth meta-model for the structural configuration to estimate an impact energy to establish a threshold dent depth in the structural configuration; performing a computer-based simulation with the structural configuration utilizing the impact energy from the dent depth meta-model; and determining at least one design value for the structural configuration based on output data generated from the computer-based simulation.

Clause 2: The method of clause 1, wherein developing the dent depth meta-model includes providing a greater weight to the historical physical test dataset of a plurality of previously analyzed physical composite components based on a similarity of material or configuration between the structural configuration and a corresponding one of the previously analyzed physical composite components.

Clause 3: The method of any of clauses 1-2, wherein the plurality of previously analyzed physical composite components includes composite components from multiple different vehicle platforms.

Clause 4: The method of any of clauses 1-3, wherein the historical physical test dataset includes a plurality of test data inputs associated with corresponding test data outputs for a plurality of previously analyzed physical composite components.

Clause 5: The method of any of clauses 1-4, wherein the test data inputs include at least one of a force-time history, displacement-time history, an impact energy-time history, an impactor configuration, a dent depth, material properties, relevant boundary conditions, or a composite structural configuration defining composite layup and geometry.

Clause 6: The method of any of clauses 4-5, wherein the material properties include at least one of mode 1 strain energy rates, mode 2 strain energy rates, interlaminar strengths, stiffness ply properties, or ply strength properties.

Clause 7: The method of any of clauses 1-6, wherein the test data outputs include at least one of damage types resulting from an impact, energy absorbed from the impact, or a measured dent depth.

Clause 8: The method of any of clauses 1-7, wherein the structural configuration includes at least one of a skin joined to a stiffening member, the skin joined to a secondary structure, or a stiffened structure joined to the secondary structured with the secondary structural including at least one of a rib or a spar.

Clause 9: The method of any of clauses 1-8, wherein the at least one metric of interest includes a dynamic stiffness, an energy absorption rate, an energy flux into the structural configuration, or an initial deflection rate.

Clause 10: The method of any of clauses 1-9, wherein output data generated from the computer-based simulation includes a determination of strength of a damaged portion of the structural configuration under at least one of compression loading, tension loading, and shear loading.

Clause 11: The method of any of clauses 1-10, wherein the composite component includes a plurality of individual composite elements fixed relative to each other.

Clause 12: The method of any of clauses 1-11, wherein the historical physical test dataset includes calculations for damage tolerance criteria based on a physical test data.

Clause 13: The method of any of clauses 1-12, wherein the machine learning algorithm includes a Bayesian based algorithm or a physics informed algorithm.

Clause 14: A non-transitory computer-readable medium embodying programmed instructions which, when executed by a processor, are operable for performing a method comprising: obtaining a structural configuration for a composite component; determining at least one metric of interest for the structural configuration; developing a dent depth meta-model based on the structural configuration of the composite component, the at least one metric of interest, and information obtained from a machine learning algorithm, wherein the at least one metric of interest provides a constraint for the dent depth meta-model and the machine learning algorithm is trained based on a historical physical test dataset of a plurality of composite components; utilizing the dent depth meta-model for the structural configuration to estimate an impact energy to establish a threshold dent depth in the structural configuration; performing a computer-based simulation with the structural configuration utilizing the impact energy from the dent depth meta-model; and determining at least one design value for the structural configuration based on output data generated from the computer-based simulation.

Clause 15: The computer-readable medium of clause 14, wherein the historical physical test set includes a plurality of test data inputs associated with corresponding test data outputs for a plurality of previously analyzed physical composite components and the historical physical test dataset includes calculations for damage tolerance criteria based on a physical test data.

Clause 16: The computer-readable medium of any of clauses 14-15, wherein the test data inputs include at least one of a force-time history, displacement-time history, an impact energy-time history, an impactor configuration, a dent depth, material properties, relevant boundary conditions, or a composite structural configuration defining composite layup and geometry.

Clause 17: The computer-readable medium of any of clauses 14-16, wherein the material properties include at least one of mode 1 strain energy rates, mode 2 strain energy rates, interlaminar strengths, stiffness ply properties, or ply strength properties.

Clause 18: The computer-readable medium of any of clauses 14-17, wherein the test data outputs include at least one of damage types resulting from an impact, energy absorbed from the impact, or a measured dent depth.

Clause 19: The computer-readable medium of any of clauses 14-18, wherein the at least one metric of interest includes a dynamic stiffness, an energy absorption rate, an energy flux into the structural configuration, or an initial deflection rate.

Clause 20: A non-transitory computer-readable medium embodying programmed instructions which, when executed by a processor, are operable for performing a method comprising: obtaining a structural configuration for a composite component; determining at least one metric of interest for the structural configuration; developing a dent depth meta-model based on the structural configuration of the composite component, the at least one metric of interest, and information obtained from a machine learning algorithm, wherein the at least one metric of interest provides a constraint for the dent depth meta-model, the machine learning algorithm is trained based on a historical physical test dataset of a plurality of composite components, and the historical physical test dataset includes calculations for damage tolerance criteria based on a physical test data; utilizing the dent depth meta-model for the structural configuration to estimate an impact energy to establish a threshold dent depth in the structural configuration; performing a computer-based simulation with the structural configuration utilizing the impact energy from the dent depth meta-model; and determining at least one design value for the structural configuration based on output data generated from the computer-based simulation.

While various embodiments have been described, the description is intended to be exemplary rather than limiting. It will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims.

What is claimed is:

1. A method of analyzing a composite structure for damage tolerance, the method comprising:
   obtaining a structural configuration for a composite component;
   determining at least one metric of interest for the structural configuration;
   developing a dent depth meta-model based on the structural configuration of the composite component, the at least one metric of interest, and information obtained from a machine learning algorithm, wherein the at least one metric of interest provides a constraint for the dent depth meta-model and the machine learning algorithm is trained based on a historical physical test dataset of a plurality of composite components, wherein developing the dent depth meta-model includes providing a greater weight to the historical physical test dataset of the plurality of composite components based on a similarity of material or configuration between the structural configuration and a corresponding structural configuration of a composite component of the plurality of composite components;
   utilizing the dent depth meta-model for the structural configuration to estimate an impact energy to establish a threshold dent depth in the structural configuration;

performing a computer-based simulation with the structural configuration utilizing the impact energy from the dent depth meta-model; and determining at least one design value for the structural configuration based on output data generated from the computer-based simulation.

2. The method of claim 1, wherein the plurality of composite components includes composite components from multiple different vehicle platforms.

3. The method of claim 1, wherein the historical physical test dataset includes a plurality of test data inputs associated with corresponding test data outputs for the plurality of composite components.

4. The method of claim 3, wherein the test data inputs include at least one of a force-time history, displacement-time history, an impact energy-time history, an impactor configuration, a dent depth, material properties, relevant boundary conditions, or a composite structural configuration defining composite layup and geometry.

5. The method of claim 4, wherein the material properties include at least one of mode 1 strain energy rates, mode 2 strain energy rates, interlaminar strengths, stiffness ply properties, or ply strength properties.

6. The method of claim 4, wherein the test data outputs include at least one of damage types resulting from an impact, energy absorbed from the impact, or a measured dent depth.

7. The method of claim 1, wherein the structural configuration includes at least one of a skin joined to a stiffening member, the skin joined to a secondary structure, or a stiffened structure joined to the secondary structure with the secondary structure including at least one of a rib or a spar.

8. The method of claim 1, wherein the at least one metric of interest includes a dynamic stiffness, an energy absorption rate, an energy flux into the structural configuration, or an initial deflection rate.

9. The method of claim 1, wherein the output data generated from the computer-based simulation includes a determination of strength of a damaged portion of the structural configuration under at least one of compression loading, tension loading, and shear loading.

10. The method of claim 9, wherein the composite component includes a plurality of individual composite elements fixed relative to each other.

11. The method of claim 10, wherein the historical physical test dataset includes calculations for damage tolerance criteria based on a physical test data.

12. The method of claim 1, wherein the machine learning algorithm includes a Bayesian based algorithm or a physics informed algorithm.

13. A non-transitory computer-readable medium embodying programmed instructions which, when executed by a processor, are operable for performing a method comprising:

obtaining a structural configuration for a composite component;

determining at least one metric of interest for the structural configuration;

developing a dent depth meta-model based on the structural configuration of the composite component, the at least one metric of interest, and information obtained from a machine learning algorithm, wherein the at least one metric of interest provides a constraint for the dent depth meta-model and the machine learning algorithm is trained based on a historical physical test dataset of a plurality of composite components, wherein developing the dent depth meta-model includes providing a greater weight to the historical physical test dataset of the plurality of composite components based on a similarity of material or configuration between the structural configuration and a corresponding structural configuration of a composite component of the plurality of composite components;

utilizing the dent depth meta-model for the structural configuration to estimate an impact energy to establish a threshold dent depth in the structural configuration;

performing a computer-based simulation with the structural configuration utilizing the impact energy from the dent depth meta-model; and determining at least one design value for the structural configuration based on output data generated from the computer-based simulation.

14. The computer-readable medium of claim 13, wherein the test data inputs include at least one of a force-time history, displacement-time history, an impact energy-time history, an impactor configuration, a dent depth, material properties, relevant boundary conditions, or a composite structural configuration defining composite layup and geometry.

15. The computer-readable medium of claim 14, wherein the material properties include at least one of mode 1 strain energy rates, mode 2 strain energy rates, interlaminar strengths, stiffness ply properties, or ply strength properties.

16. The computer-readable medium of claim 14, wherein the test data outputs include at least one of damage types resulting from an impact, energy absorbed from the impact, or a measured dent depth.

17. The computer-readable medium of claim 13, wherein the at least one metric of interest includes a dynamic stiffness, an energy absorption rate, an energy flux into the structural configuration, or an initial deflection rate.

18. A non-transitory computer-readable medium embodying programmed instructions which, when executed by a processor, are operable for performing a method comprising:

obtaining a structural configuration for a composite component;

determining at least one metric of interest for the structural configuration;

developing a dent depth meta-model based on the structural configuration of the composite component, the at least one metric of interest, and information obtained from a machine learning algorithm, wherein the at least one metric of interest provides a constraint for the dent depth meta-model, the machine learning algorithm is trained based on a historical physical test dataset of a plurality of composite components, and the historical physical test dataset includes calculations for damage tolerance criteria based on a physical test data, wherein developing the dent depth meta-model includes providing a greater weight to the historical physical test dataset of the plurality of composite components based on a similarity of material or configuration between the structural configuration and a corresponding structural configuration of a composite component of the plurality of composite components;

utilizing the dent depth meta-model for the structural configuration to estimate an impact energy to establish a threshold dent depth in the structural configuration;

performing a computer-based simulation with the structural configuration utilizing the impact energy from the dent depth meta-model; and determining at least one design value for the structural configuration based on output data generated from the computer-based simulation.

19. The computer-readable medium of claim 13, wherein the structural configuration includes at least one of a skin joined to a stiffening member, the skin joined to a secondary structure, or a stiffened structure joined to the secondary structure with the secondary structure including at least one of a rib or a spar.

20. The computer-readable medium of claim 13, wherein the output data generated from the computer-based simulation includes a determination of strength of a damaged portion of the structural configuration under at least one of compression loading, tension loading, and shear loading.

* * * * *